United States Patent [19]

Fagan et al.

[11] Patent Number: 4,991,094
[45] Date of Patent: Feb. 5, 1991

[54] METHOD FOR LANGUAGE-INDEPENDENT TEXT TOKENIZATION USING A CHARACTER CATEGORIZATION

[75] Inventors: Joel L. Fagan, Silver Spring; Michael D. Gunther, Gaithersburg; Paul D. Over, Germantown; Greg Passon, Germantown; Chien C. Tsao, Germantown; Antonio Zamora; Elena M. Zamora, both of Chevy Chase, all of Md.

[73] Assignee: International Business Machines Corporation, Armonk, N.Y.

[21] Appl. No.: 344,341

[22] Filed: Apr. 26, 1989

[51] Int. Cl.[5] ............................................. G06F 15/21
[52] U.S. Cl. .................................. 364/419; 364/900; 364/200
[58] Field of Search ........................ 364/419, 900, 200,

[56] References Cited

U.S. PATENT DOCUMENTS

| | | | |
|---|---|---|---|
| 4,057,849 | 11/1977 | Ying et al. | 364/200 |
| 4,130,882 | 12/1978 | Swanstrom et al. | 364/900 |
| 4,152,762 | 5/1979 | Bird et al. | 364/200 |
| 4,456,969 | 6/1984 | Herzik et al. | 364/419 |
| 4,623,985 | 11/1986 | Morimoto et al. | 364/900 |
| 4,747,053 | 5/1988 | Yoshimura et al. | 364/419 |
| 4,887,212 | 12/1989 | Zamora et al. | 364/419 |

OTHER PUBLICATIONS

M. E. Lesk et al., "Lex—A Lexical Analyzer Generator," *Computer Science Technical Reports*, 39, Bell Labs, Murray Hill, N.J. Oct. 1975, pp. LEX-1-LEX-13.

Primary Examiner—Michael R. Fleming
Assistant Examiner—Ayaz R. Sheikh
Attorney, Agent, or Firm—John E. Hoel

[57] ABSTRACT

A computer method is disclosed to isolate linguistically salient strings ("words") from a natural language text stream. The process is applicable to a variety of computer hardware, to any character encoding scheme, and to the idiosyncrasies of most natural languages.

15 Claims, 11 Drawing Sheets

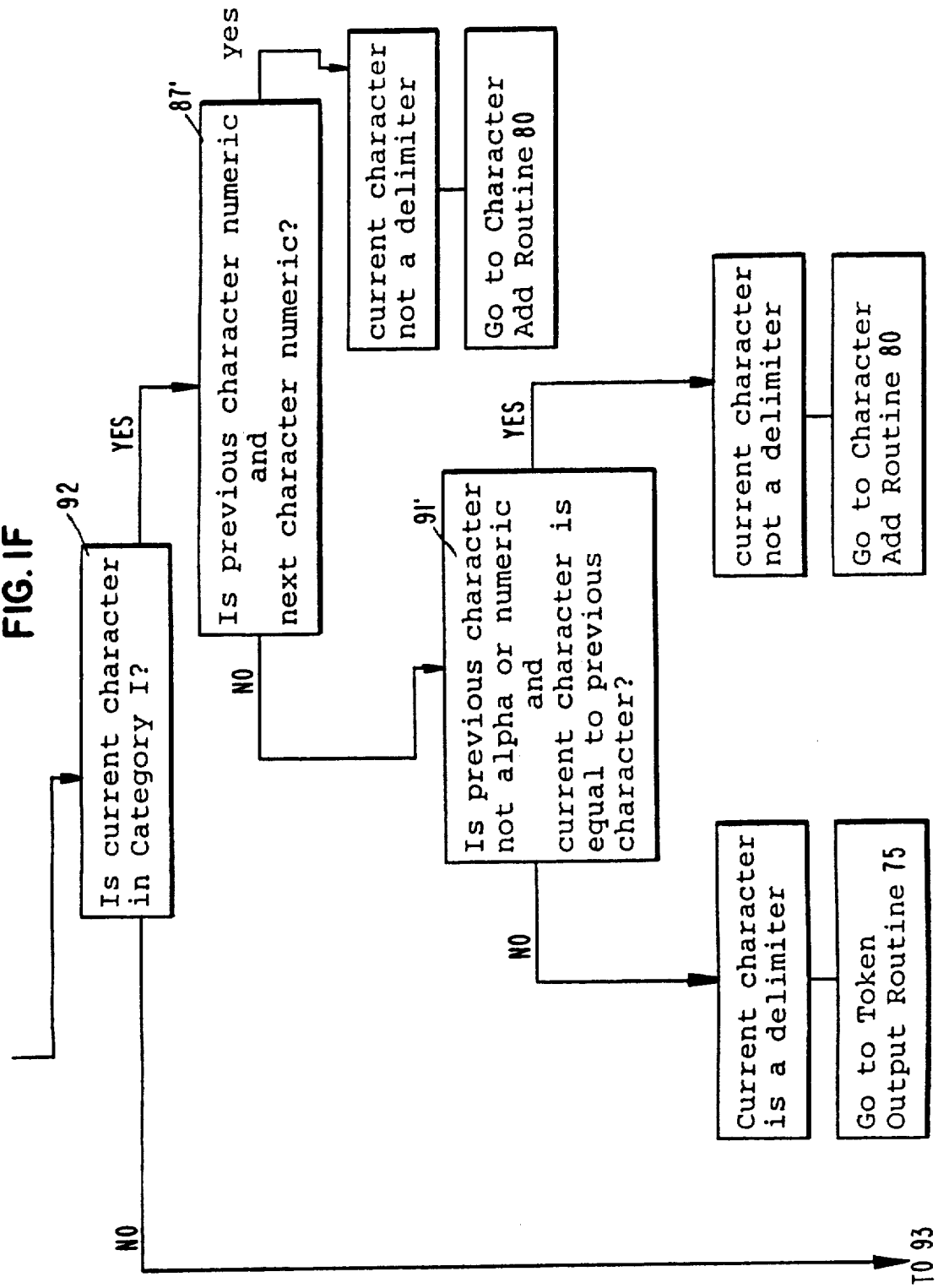

EXAMPLE 1

"•" CHARACTER CODE = HEX 4B (TABLE 2)

"•" CATEGORY = K (TABLE 1)
CURRENT CHARACTER IS NOT A DELIMITER.

EXAMPLE 2

"•" CHARACTER CODE = HEX 4B (TABLE 2)

"•" CATEGORY = K (TABLE 1)
CURRENT CHARACTER IS A DELIMITER.

METHOD FOR LANGUAGE-INDEPENDENT TEXT TOKENIZATION USING A CHARACTER CATEGORIZATION

BACKGROUND OF THE INVENTION

1. Technical Field

The invention disclosed broadly relates to data processing methods and more particularly relates to an improved computer method for language-independent text tokenization.

2. Background Art

The identification of words and their delimiters is a necessary step for any natural language processing task. Word isolation is also called "tokenization" because the process generates word and punctuation tokens. Since many linguistic tasks depend on dictionary or database lookup, it is imperative to be able to isolate words in a way that will consistently match against a dictionary or a search database The technique for isolating words affects the content of the dictionary or database and the applications which use it. Should the dictionary include contractions like "can't" or hyphenated words like "mother-in-law"? If capitalized words are allowed, will there be a distinction between "Victor" and "victor", "Bill" and "bill"? Will the dictionary contain multiple word entries such as "hot dog" or abbreviations like "etc."? Will words with numeric characters such as "42nd" or "B-52" be allowed? How should telephone numbers with hyphens and area codes in parentheses be tokenized?

If the dictionary is designed for languages other than English, word isolation needs to accommodate language-specific conventions. In French, contracted prefixes are found on many words, e.g., "l'enveloppe" (the envelope); these prefixes are generally not included as part of the dictionary entries. Similarly, some hyphenated French words, such as "permettez-moi" (permit me) also need to be recognized as separate words even though they are attached with a hyphen.

The objective of the current invention is to provide a means of isolating words from a stream of natural language text in a consistent way for a plurality of computer hardware and natural languages by use of a character categorization table. The categorization table simplifies definition of tokens over the prior art and makes it possible to customize the process for specific computers or for specific linguistic or database applications.

PRIOR ART

In a prior art technique, words are identified by isolating strings delimited by blanks and then removing leading and ending punctuation characters. A second prior art technique isolates only alphanumeric strings that contain imbedded hyphens or apostrophes. Although these approaches succeed in isolating words for a large proportion of the text, they do not tokenize properly many unusual cases.

A third prior art technique uses a lexical analyzer for which it is necessary to write a grammatical description. (Lesk, M.E., and Schmidt, E., "LEX - A Lexical Analyzer Generator", *Comput. Sci. Tech. Rep. 39*, Bell Laboratories, Murray Hill, N.J., Oct. 1975). This work describes a pattern matching program where the patterns are associated with statements in the C programming language that perform specific actions when the patterns are matched. LEX can be used to isolate words, but it is so closely linked with the C language that its complexity is more suited for analyzing computer languages rather than natural language.

Related Patent Application

A related copending patent application (now U.S. Pat. No. 4,887,212) is by A. Zamora, M. Gunther and E. Zamora entitled "A Parser for Natural Language Text,", Ser. number 924,670, filed Oct. 29, 1986 and assigned to the IBM Corporation, this patent application being incorporated herein by reference for providing an illustration of prefix/suffix parsing and other natural language parsing techniques.

Objects of the Invention

It is therefore an object of the invention to provide an improved method for language-independent tokenization.

It is another object of the invention to provide an improved method for isolating words from a stream of natural language text.

It is yet a further object of the invention to provide an improved method for isolating words from a stream of natural language text for a plurality of computer types.

It is yet a further object of the invention to provide an improved method for isolating words from a stream of natural language text for a variety of natural languages.

Summary of the Invention

The subject invention segments an input stream of natural language text into simple tokens that correspond closely to words. A simple token is a string of characters separated by delimiters. Delimiters typically include blank and punctuation characters.

Since simple tokens are separated by delimiters, the nature of a simple token depends on the definition of delimiters. Blank is considered a basic delimiter in the sample character classification table given below. Punctuation marks, that is, characters other than alphabetics, numerics and the basic delimiter are also delimiters, but some are treated as delimiters only under certain conditions. For example, in many contexts "." is a delimiter. However, when surrounded by numeric characters, it is not a token delimiter (e.g., 3.1416).

Brief Description of the Drawings

These and other objects, features and advantages of the invention will be more fully appreciated with reference to the accompanying figures.

FIG. 1F is the portion of the flow diagram which processes Category I current characters.

Figure 1A:
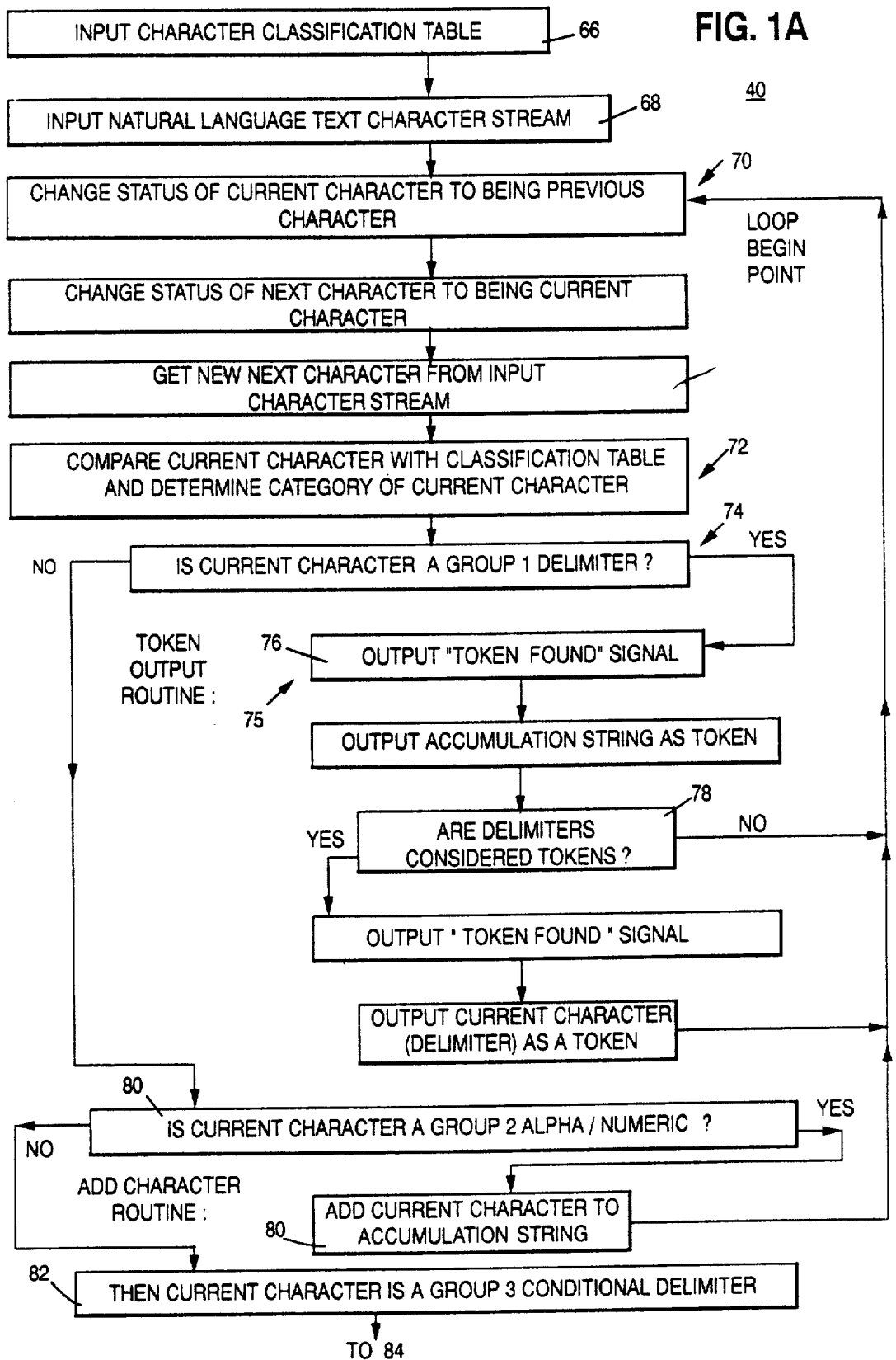
FIG. 1A shows the portion of the flow diagram for determining whether the current character is a Group 1 delimiter or a Group 2 alphanumeric character.

Description of the Best Mode for Carrying Out the Invention

Tokenization Character Categories

Tokens are defined by a tokenization algorithm, which decides for each character in the input, whether it belongs to the current token or not. The algorithm makes its decision based on the category to which each character is assigned in the character classification table. The categories fall into three major groups.

Group 1 consists of categories A and D which are delimiters in all contexts. Group 2 defines Categories L, U, an N which are never delimiters. Group 3 consists of characters which may conditionally be delimiters (categories E to K) depending on the context in which they are used.

The characters in Category H, e.g., ".!?", have a special status. When identical characters from this category occur together in a sequence, the individual characters do not act as delimiters. Instead, the entire sequence of characters forms a single token. However, the sequence of characters taken together does act as a delimiter, since the sequence forms a token separate from characters that precede and follow it. For example, the text stream "abc . . . def" is broken into three tokens: "abc", ". . . ", and "def". Similarly, "Unbelievable!!!!" yields two tokens, not five ("Unbelievable" and "!!!!") and "Astounding!!!???" yields three tokens, not seven ("Astounding", "!!!", and "???").

Group 1 Categories

Category A

Basic delimiter (this category can only contain one character such as the blank character).

Category D

Delimiters other than the basic delimiter such as parentheses, braces, and ampersand.

Group 2 Categories

Category L

Lower case alphabetic characters, e.g., "a", "b", "c"

Category U

Upper case alphabetic characters, e.g., "A", "B", "C"

Category N

Numeric characters not including superscripts or subscripts, e.g., "0", "1", "2"

Group 3 Categories

Notation Definitions used to define Group 3 categories.

p=[y |P ]- any character in P,
a=[y |L or U ]- any character in L or U,
n=[y N ]- any character in NO Punctuation is any character that is neither alphabetic nor numeric and is defined by the notation P=[y |not( L or U or N ) ].

The '<' symbol is used to mean 'precedes'. Thus "<b" means that "a" precedes "b".

Category E

E=[e |a<e <a ]set of punctuation characters not treated as delimiters when surrounded by alphabetics, e.g., apostrophe.

Category F

F=[f|n<f<n ]set of punctuation characters not treated as delimiters when surrounded by numerics, e.g., . , : /

Category G

G=[g |p<g <n ]set of punctuation characters not treated as delimiters when preceded by punctuation and followed by a numeric, e.g., . , $

Category H

H=[h |((p <h) and (h=p) ]set of punctuation characters not treated as delimiters when immediately preceded by an identical character e.g., . , : / - * =#%

Category I

I=[|i F and H ]i is an element of F and H e.g., . , : /

Category J

J=[j |E and F and H]j is an element of E and F and H

Category K

K=[k |F and G and H ]k is an element of F and G and H e.g., . ,

Character Classification Table

A classification table is an array indicating the category for each character. Each character must be assigned exactly one category. If, according to the above definition of sets, a character is a member of more than one category, it should be assigned to the highest level category (i.e, the category with the letter name latest in alphabetical order).

An application program can define its own classification table depending on the hardware used and the natural language to be processed. Table 1 is an example of the classification table for code page 500 (similar to EBCDIC) shown in Table 2, for a mainframe computer processing English text. An equivalent classification table can be coded for a personal computer that uses an alternate character code, such as the ASCII character set.

Table 1 is a sample character classification table for use with code page 500 for the IBM/370 computer shown in Table 2. Table 1 indicates the classification of each of the 256 possible characters that can be defined using 8-bit characters. The numbers in the columns and rows are used to index to any particular character. Thus in Table 1, the classification "A" of the blank character (hexadecimal 40) is found in the row marked "4-" and under column "0" and the classification "K" of the period "." character (hexadecimal 4B) is found in row "4" under column "B."

TABLE 1

| 1st/2nd | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0- | D | D | D | D | D | D | D | D | D | D | D | D | D | D | D | D |
| 1- | D | D | D | D | D | D | D | D | D | D | D | D | D | D | D | D |
| 2- | D | D | D | D | D | D | D | D | D | D | D | D | D | D | D | D |
| 3- | D | D | D | D | D | D | D | D | D | D | D | D | D | D | D | D |
| 4- | A | D | L | L | L | L | L | L | L | L | D | K | D | D | D | H |
| 5- | D | L | L | L | L | L | L | L | L | L | D | G | H | D | D | D |
| 6- | I | I | U | U | U | U | U | U | U | U | D | K | H | D | D | H |
| 7- | L | U | U | U | U | U | U | U | U | D | I | H | D | E | H | D |
| 8- | U | L | L | L | L | L | L | L | L | L | D | D | L | L | L | D |
| 9- | D | L | L | L | L | L | L | L | L | L | P | D | L | D | U | D |
| A- | D | D | L | L | L | L | L | L | L | L | P | D | U | U | U | D |
| B- | D | G | G | E | D | D | D | D | D | D | P | D | D | D | E | D |
| C- | D | U | U | U | U | U | U | U | U | U | Ď | L | L | L | L | L |
| D- | D | U | U | U | U | U | U | U | U | U | Ď | L | L | L | L | L |
| E- | D | D | U | U | U | U | U | U | U | D | U | U | U | U | U | U |
| F- | N | N | N | N | N | N | N | N | N | D | U | U | U | U | U | D |

The following examples of tokenization are produced when the character classification table, Table 1, is used in the preferred embodiment of the invention. In this example, each token is separated by blanks in the rightmost column.

| Description | Text | Token(s) |
|---|---|---|
| Simple words | book | book |
| | Bethesda | Bethesda |
| | 49ers | 49ers |
| Contractions | we'll | we'll |
| | '49ers | ' 49ers |
| | goin' | goin ' |
| | '77 | ' 77 |
| | 1980's | 1980 ' s |
| Prefixed forms | j'accuse | j'accuse |
| | all'O.d.G | all'O . d . G |
| Enclitic forms | dame | dame |
| Compounds | schwarzblau | schwarzblau |
| Dates | 11/12/87 | 11/12/87 |
| | 11-12-87 | 11-12-87 |
| | 12.11.87 | 12.11.87 |
| | 12.XI.87 | 12 . XI . 87 |
| Time | 10:45:07 | 10:45:07 |
| | 09:15:20.13 | 09:15:20.13 |
| Money | $10.15 | $10.15 |
| Numbers | 10,115.071 | 10,115.071 |
| | 10.115,071 | 10.115,071 |
| | .025 | .025 |
| Phone numbers | 794-8951 | 794-8951 |
| | 301/794-8951 | 301/794-8951 |
| | 301-794-8951 | 301-794-8951 |
| | (301)794-8951 | ( 301 ) 794-8951 |
| Hyphenated forms | mother-in-law | mother-in-law |
| | followings- | followings - |
| | F-104 | F - 104 |
| Slashed forms | c/o | c / o |
| | and/or | and / or |
| | System/370 | System / 370 |
| Outline labels | 3.1 | 3.1 |
| | 3.a | 3 . a |
| | III.b | III . b |
| Bracketed forms | (un)parsable | ( un ) parsable |
| | book(s) | book ( s ) |
| | arctan(n) | arctan ( n ) |
| | flavo(u)r | flavo ( u ) r |
| Math expressions | C1*R1/R2 | C1 * R1 / R2 |
| | 8*5/3 | 8 * 5/3 |
| Abbreviations | Ph.D. | Ph . D . |
| | Mr. | Mr . |
| | U.S.A. | U . S . A . |
| | USA | USA |
| | Sig.ri | Sig . ri |

A pseudo code program for the invention performs the following steps:

```
Check if input is legal
Initialize based on character classification tables.
Get an input element
    If element is not text element
        Calculate the number of trailing basic delimiters
        Create a non-text token and append it to the output
            token list
        Return
    If element is a text element
        Set token found to false
        Scan the text stream character-by-character until
            a token found
        If text character is in Class A
            Calculate the number of trailing basic
                delimiters
            If no previous token
                Create a text token to store the basic
                    delimiters return
            If previous token exists
                Set the number of trailing delimiters of
                    the previous token to the number of
                    trailing
                    basic delimiters
            Set token found to true
        If text character is in Class D
            If current token needs to be created
                Create a token
            If previous token exists
                Join previous token and current token
            set token found to true
        If text character is in Group 2
            Increment the current token length
            If the end of the element
                Create a current token
                Join the previous token if there is one
            Get next element
            Advance the current data position
        If text character is in Group 3
            Check context and determine if it is a
                delimiter
            If it is a delimiter
                execute process for Class D above.
            If it is not a delimiter
                execute process for Group 2 above.
```

Following the isolation of the tokens, these are further processed by matching for specific prefixes and suffixes. Successfully matched tokens can be further divided into more elementary tokens.

Figure 1B:
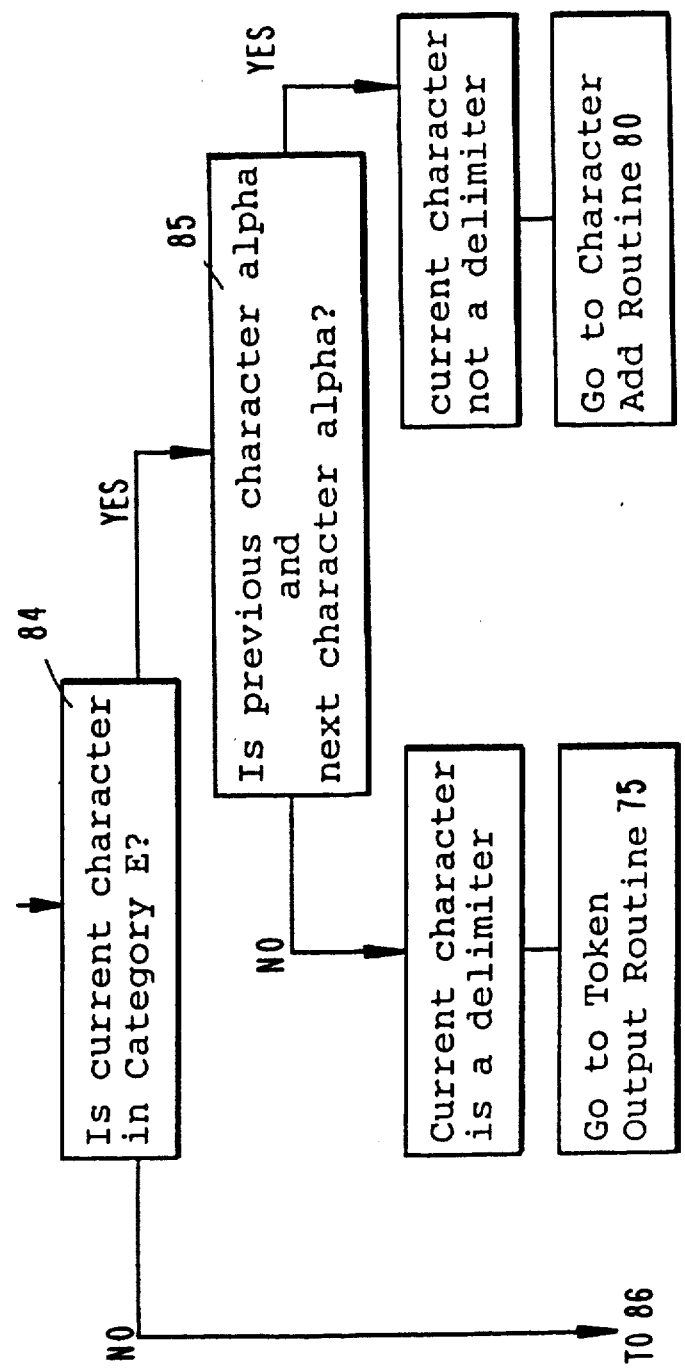
FIG. 1B shows a portion of the flow diagram which processes Category E current characters.
Figure 1:
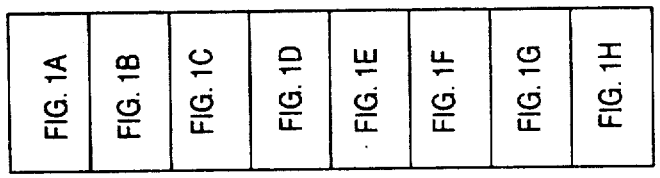
FIG. 1 depicts the relationship of FIGS. 1A-1H illustrating the flow diagram of the method for text tokenization.

FIG. 1 illustrates the relationship of FIGs. 1A-1H, which describe the flow diagram of the method for text tokenization, which can be embodied as the program instructions 40. FIG. 2 illustrates a data processing system such as a personal computer or a mainframe System 370 type computer, for performing text tokenization, executing the text tokenization program instructions 40, illustrated in FIG. 1. The data processing system 20 of FIG. 2 includes the memory 22 connected by means of the bus 26 to the Central Processing Unit (CPU) 24. The keyboard 28, display 30, disk 32, printer 34, Optical Character Recognition machine (OCR) 35, and communications adapter 36 can all be connected to the bus 26 in the data processing system 20 of FIG. 2.

The memory 22 is partitioned to store the text tokenization program instructions 40, which will carry out the method of the invention, when executed by the CPU 24. Operating system program instructions 42 provide supporting routines for the operation of the system 20. Additional partitions in the memory can include the token (string) storage area 44, the pointer storage area 46, the accumulating string register area 48, the counter register 52, the counter register 54, the memory offset register 56 and the three stage shift register partition 58, whose functions will be described later. At least one memory partition is set aside for the character classification table 50. In the embodiment of the data processing system 20 shown in FIG. 2, the character classification table 50 stores a classification table for processing English text on a computer using EBCDEC code. In addition, a first alternate character classification table 50A can also be stored which can be used for processing English text having characters encoded using the ASCII code. A second alternate character classification table 50B can be included for processing French text whose characters are encoded in EBCDEC code. A third alternate character classification table 50C can be used to process Russian text in the Cyrillic alphabet using its own special character code.

Still further partitions in the memory 22 can be set aside for a dictionary application program 60, a database application program 61, a language translation application program 62, and an editing or word processing application program 63. Each of these application programs 60-63 can make use of text tokenization as produced by the invention.

Figure 3:
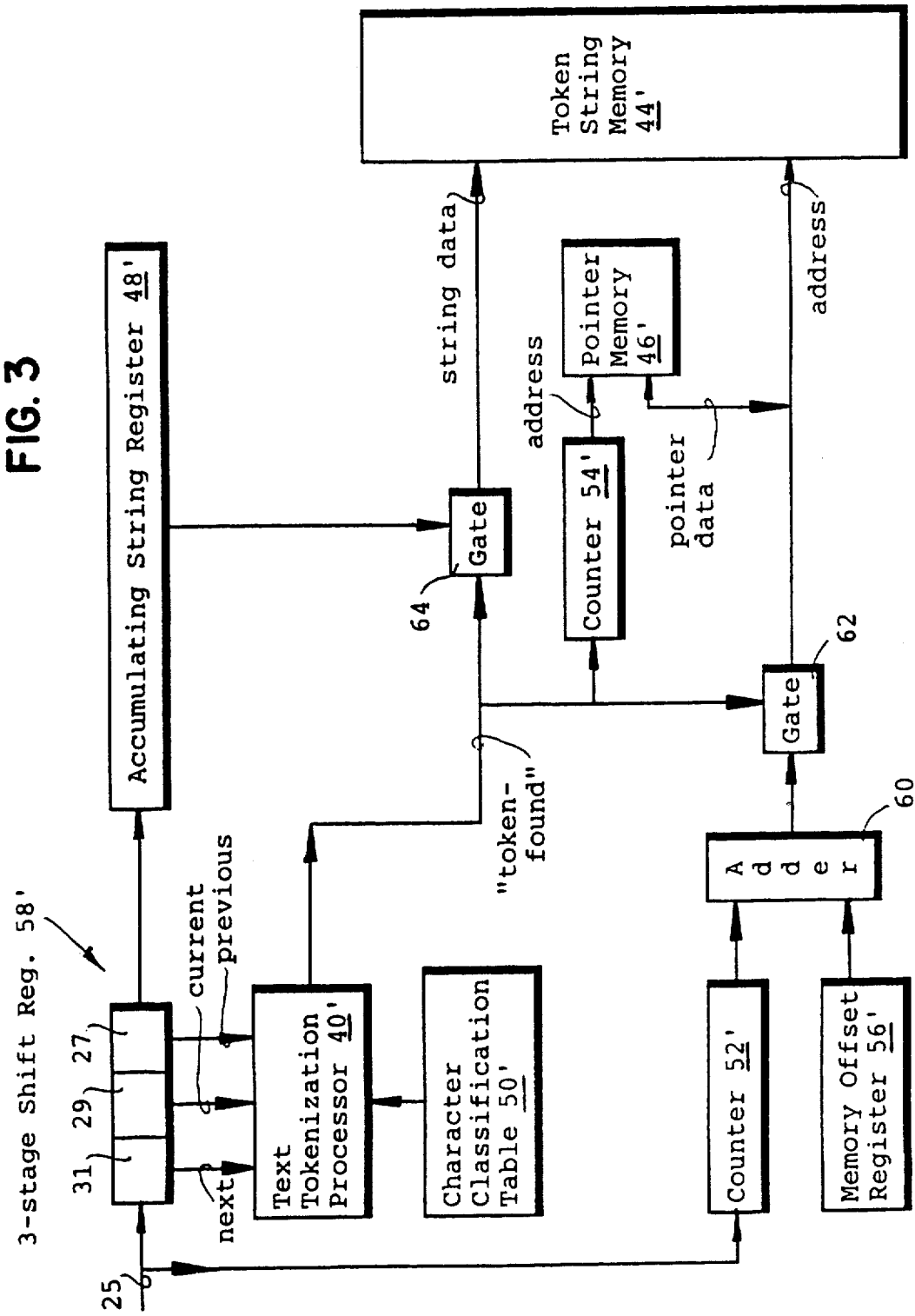
FIG. 3 is a functional block diagram of an alternate hardware embodiment of the invention for performing text tokenization.

FIG. 3 shows a functional block diagram of an alternate, hardware embodiment for the text tokenization invention. FIG. 3 is useful in describing the general operation of text tokenization in accordance with the invention. A natural language text character input stream 25 will include a sequence of characters which were intended by the originator thereof as words separated by blanks and by punctuation. The input stream 25 can be input from a keyboard 28, a disk 32, a communications adapter 36 connected to a communications link, or from an optical character recognition machine 35 which would be scanning a document. The input stream 25 in FIG. 3 is applied to the input of a three stage shift register 58'. As the characters progress through the three stage shift register 58', the previous character is located in stage 27, the current character is located in stage 29, and the next character is located in stage 31. These three characters are applied to the text tokenization processor 40' which processes the method for text tokenization whose flow diagram is illustrated in FIG. 1. Each character in the input stream 25 is counted in the counter 52'. The memory offset register 56' stores the starting address in the token (string) memory 44' which is the beginning location for the first token identified by the embodiment of FIG. 3 for storage in the token memory 44'. The adder 60 adds the value in the counter 52' to the memory offset register contents 56' and uses this sum as the address to be applied to the token memory 44' for identifying the location for storage of each respective token identified by the text tokenization processor 40'. As each token is found by the text tokenization processor 40', a "token found" signal is output to the gate 64, and the gate 62 and to the counter 54'. As the characters in the input stream 25 are applied to the hardware embodiment shown in FIG. 3, they are accumulated in the accumulating string register 48' until a token is identified by the text tokenization processor 40'. When the "token found" signal is output to the gate 64, the accumulated characters in the accumulating string register 48' are output as string data to the data input of the token memory 44', at the same time that the address value output by the adder 60 is passed through the gate 62 to the address input of the token memory 44'. At the same time, the address output of the adder 60 is passed through the gate 62 as pointer data to the pointer memory 46'. The counter 54' counts each "token found" signal as an event and the counted events in the counter 54' are used as the address value applied to the pointer memory 46'. In this manner, as each token is identified by the text tokenization processor 40', it is stored at a location in the token (string) memory 44' whose address is pointed to by the pointer memory 46'.

The data processing system embodiment of the invention shown in FIG. 2 has the same general mode of operation as that described for the hardware embodiment of the invention shown in FIG. 3. The corresponding partitioned portions in the memory 22 have their reference numbers without the prime notation, corresponding to the primed reference numbers in the hardware embodiment of FIG. 3. For example, the character classification table 50 shown as a memory partition in the memory 22 of the data processing system 20 of FIG. 2, corresponds to the classification table 50' in FIG. 3, whose hardware embodiment has an output connected to the text tokenization processor 40'. The text tokenization program instructions 40 in the partition of memory 22 in FIG. 2 corresponds to the text tokenization processor 40' in the hardware embodiment of FIG. 3. The hardware embodiment of FIG. 3 is useful in understanding the operation of the data processing system embodiment 20 of FIG. 2.

The flow diagram of FIG. 1, for the method for text tokenization, is applicable both for the text tokenization program instructions 40 in the data processing system of FIG. 2 and also for the text tokenization processor 40' in the hardware embodiment of FIG. 3. In FIG. 1A, the portion of the flow diagram shown starts with inputting the character classification table 50 in step 66 into the memory partition 50 of the memory 22. Alternately, the character classification table can be input to the classification table storage unit 50' in the hardware embodiment of FIG. 3. Next in the flow diagram of FIG. 1A, step 68 inputs the natural language text character string 25. Then, the loop begin point at step 70 changes the status of the current character to be the previous character, the next character to be the current character and then gets a new next character from the input character stream. This corresponds to the operation of the three stage shift register 58' in FIG. 3 and the three stage shift register partition 58 in the memory 22 of the data processing system of FIG. 2.

Figure 4:
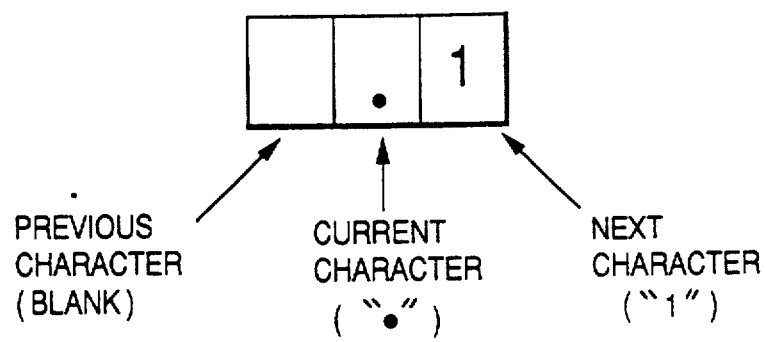
FIG. 4 illustrates Example 1.

The next step 72 in the flow diagram of FIG. 1 compares the current character with the classification table 50 and determines the category of the current character. For example, reference can be made to FIG. 4 which shows Example 1 of having a character sequence of ".1". The blank is the previous character, the "." is the current character, and the "1" is the next character.

The character coding table in Table 2 shows that the "." character has a character code of a hexadecimal 4B. Referring to the character classification table of Table 1, the "." has a category of K. This is the operation that is performed by step 72 in FIG. 1A.

The remaining steps following step 72 in the flow diagram of FIG. 1A and all of the steps shown in FIGS. 1B-1H of the flow diagram, carry out the text tokenization process based upon the category of the current character which has been determined in step 72. In FIG. 1A, the next step 74 determines whether the current character is a Group 1 delimiter. If yes, then the token output routine 75 starts with step 76 outputting the "token found" signal. Then, the accumulation string which has accumulated the characters for the token just found, in the accumulating string register 48' of FIG. 3 or in the accumulating string register area partition 48 of FIG. 2, has its contents output. The contents will be stored in the token string storage area 44 of the data processing system of FIG. 2 or alternately in the token (string) memory 44' of FIG. 3. Next, step 78 checks an initial condition flag which was set by the user, which provides the option of considering delimiters as tokens or alternately ignoring delimiters as not being tokens. This can be further refined into merely ignoring blanks as not being tokens or alternately other selected Group 1 delimiters as not being tokens. Based upon the user's selection, if delimiters are to be considered tokens in step 78, then another "token found" signal is output and the current character, which is the delimiter, is output as a token for storage in the token storage area 44 or 44'. The token output routine 75 then returns to the loop begin point 70 where another character is input from the input string 25 and the processing continues.

If step 74 has determined that the current character is not a Group 1 delimiter, then the program goes to step 80 which determines whether the current character is a Group 2 alphabetical character, either uppercase, or lowercase, or whether it is a numeric character. If it is any of these, then that character will be added to the string of characters accumulating in the accumulating string register 48' or 48, by the character add routine 80, which adds the current character to the accumulation string. The character add routine 80 then returns to the loop begin point 70.

If in FIG. 1A, the current character is neither a Group 1 delimiter nor a Group 2 alphanumeric character, then the program goes to step 82 where the current character is considered to be a Group 3 conditional delimiter and the program flows to step 84 in the flow diagram of FIG. 1B.

In the flow diagram of FIG. 1B, a determination is made as to whether the current character is in Category E, in step 84. If it is, then in step 85 a determination is made as to whether the previous character is an alphabetical character and whether the next character is an alphabetical character. If they are, then the current character is not a delimiter and the routine goes to the character add routine 80 where the current character is added to the accumulating string in the register 48 or 48'. If step 85 results in a negative output, then the current character is considered a delimiter in this context and the program flows to the token output routine 75 where a "token found" signal is output and the characters accumulated in the accumulation string are also output. If step 84 of FIG. 1B determines that the current character is not a Category E character, then the program flow to step 86 in FIG. 1C.

Figure 1C:
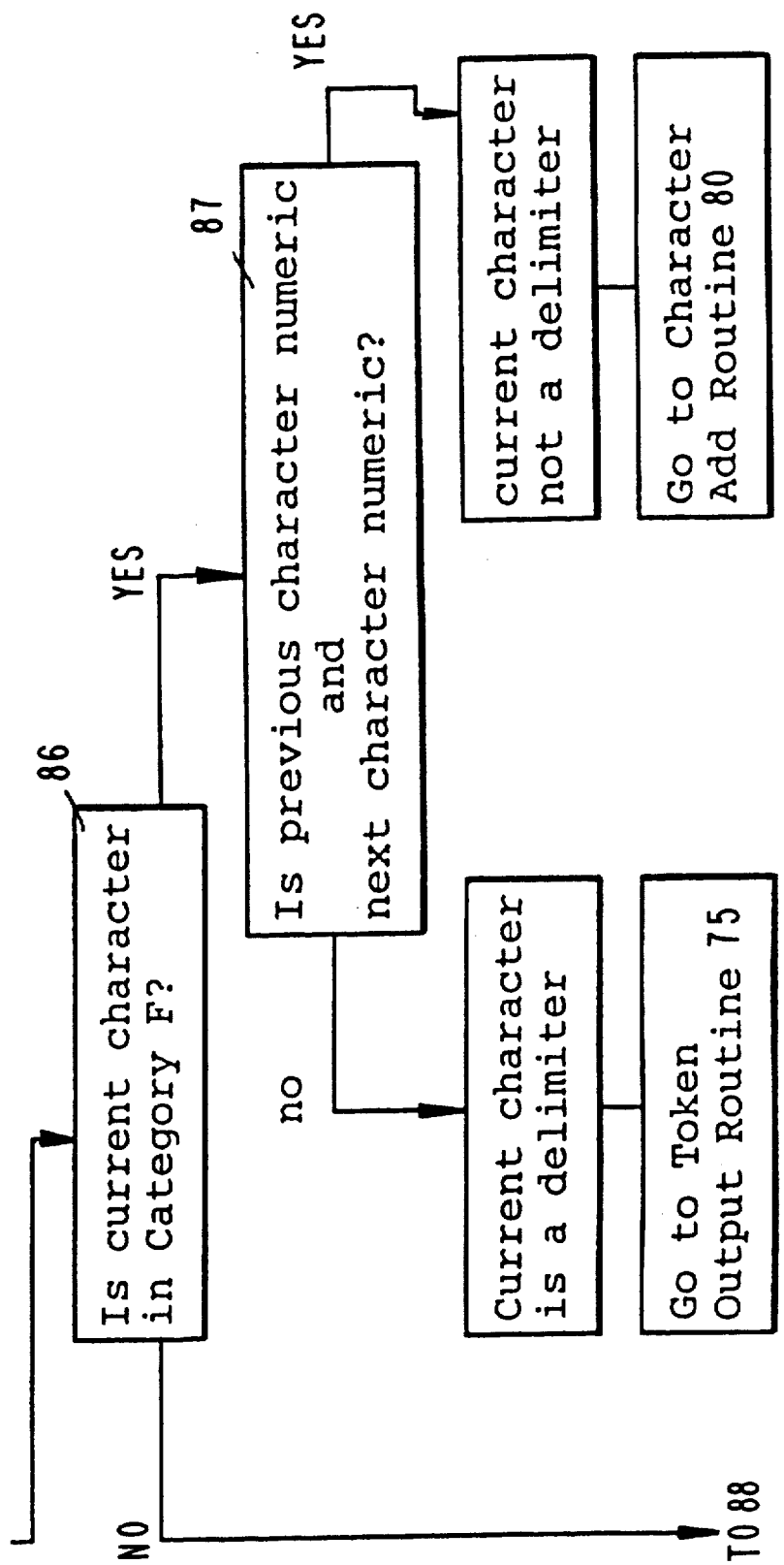
FIG. 1C is the portion of the flow diagram which processes Category F current characters.

In FIG. 1C, step 86 determines whether the current character is Category F. If it is, then a determination is made as to whether the previous character is numeric and whether the next character is numeric in step 87. If they are, then the current character is considered not a delimiter and the program flows to the character add routine 80. If instead, step 87 determines a negative output, then the current character is considered a delimiter in this context and the program flows to the token output routine 75. If the current character is determined not to be a Category F in step 86, then the program flows to step 88 in FIG. 1D.

Figure 1D:
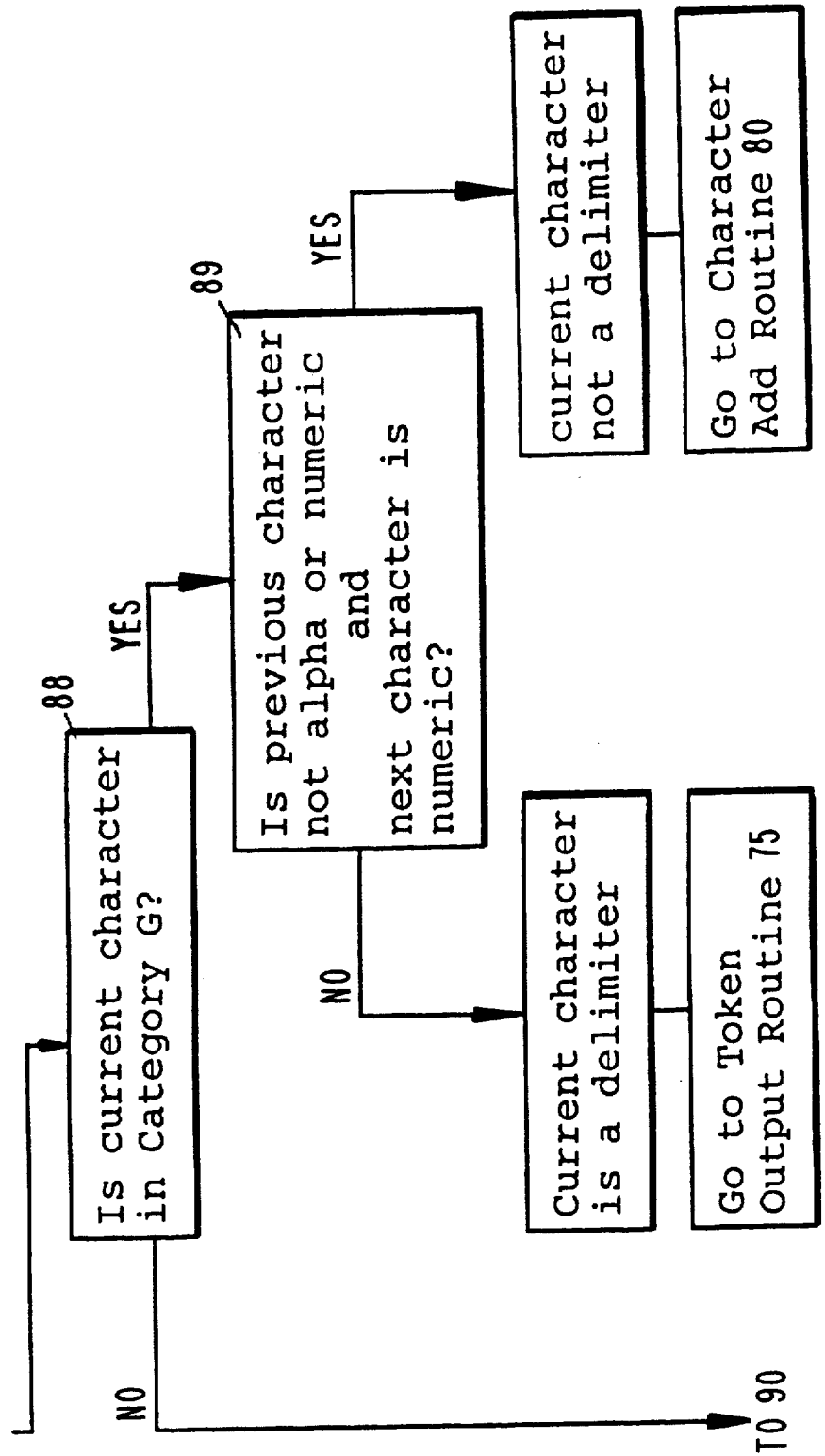
FIG. 1D is the portion of the flow diagram which processes Category G current characters.

In FIG. 1D, step 88 determines whether the current character is in Category G. If it is, then in step 89, a determination is made as to whether the previous character is not an alphabetic character and not a numeric character and also whether the next character is a numeric character. If this is true, then the current character is considered not a delimiter and the program flows to the character add routine 80. Instead, if step 89 determines the negative, then the current character is considered to be a delimiter in this context and program flows to the token output routine 75. If the current character is determined not to be in Category G in step 88, then the program flows to step 90 in FIG. 1E.

Figure 1E:
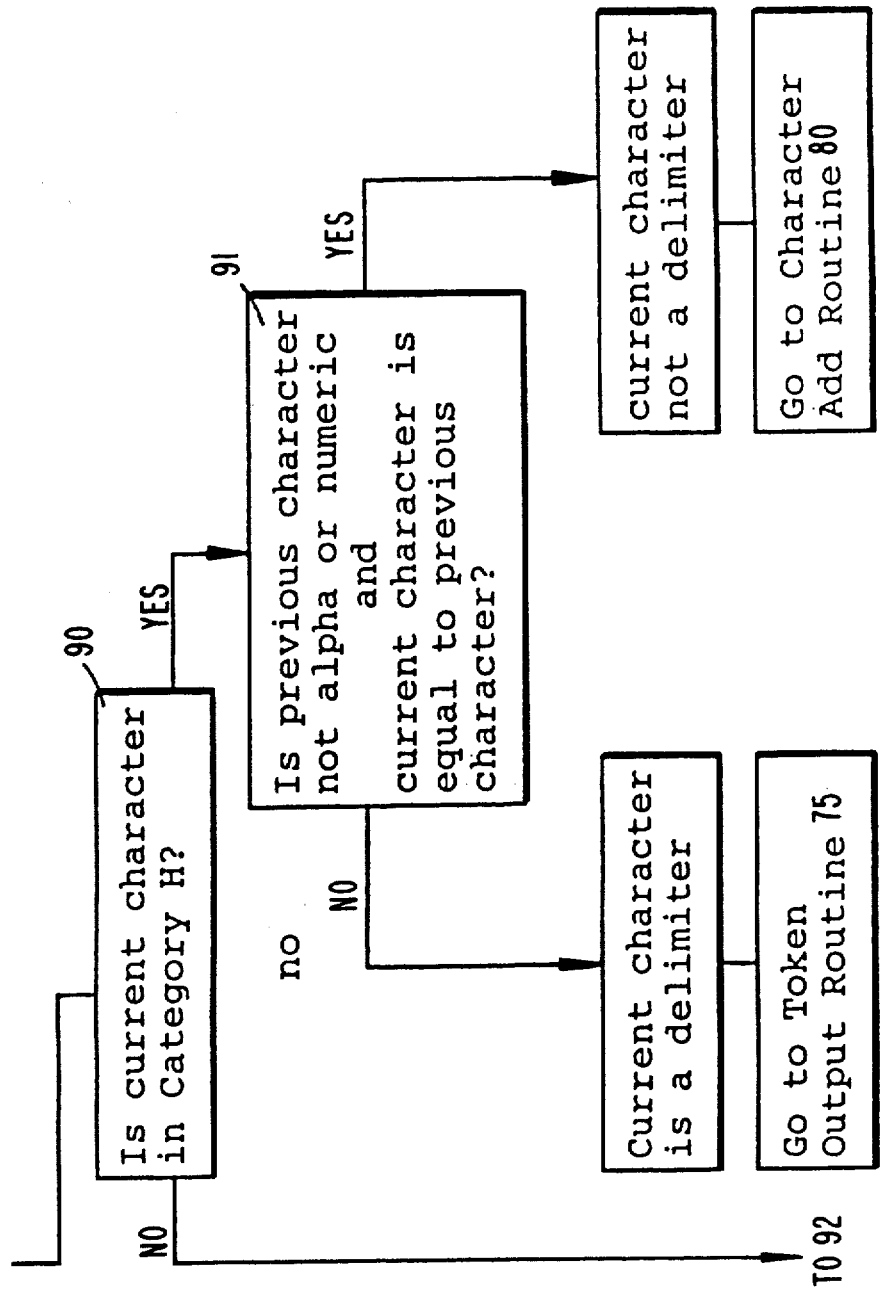
FIG. 1E is the portion of the flow diagram which processes Category H current characters.
Figure 2:
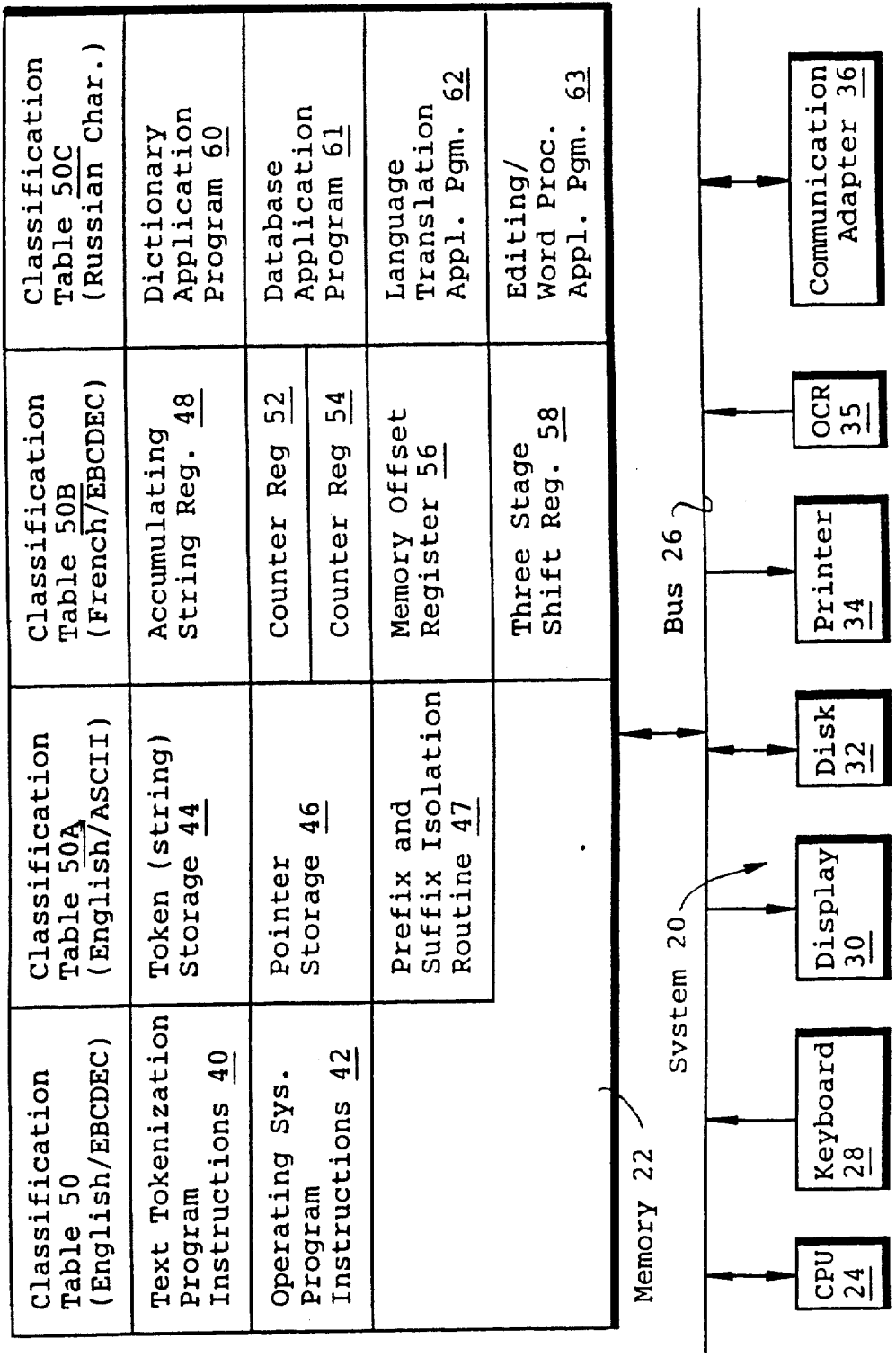
FIG. 2 is a functional block diagram of a data processing system for performing text tokenization.

In FIG. 1E, step 90 determines whether the current character is in Category H. If it is, then in step 91, a determination is made as to whether the previous character is not an alphabetic character and not a numeric character and also whether the current character is equal to the previous character. If it is, then the current character is considered not to be a delimiter and the program flows to the character add routine 80. If instead, step 91 determines the negative, then the current character is considered to be a delimiter in this context and the program flows to the token output routine 75. If step 90 determines that the current character is not a Category H, then the program flows to step 92 in FIG. 1F.

In FIG. 1F, step 92 determines whether the current character is in Category I. If it is, then step 87' determines whether the previous character is numeric and whether the next character is numeric. If it is, then the current character is considered not to be a delimiter and the program flows to the character add routine 80. However, if step 87' determines the negative, then the program flows to step 91' where it is determined whether the previous character is not an alphabetic character and not a numeric character and whether the current character is equal to the previous character. If it is, then the current character is considered not to be a delimiter and the program flows to the character add routine 80. If instead, step 91' determines the negative, then the current character is considered to be a delimiter in this context and the program flows to the token output routine 75. If step 92 determines that the current character is not Category I, then the program flows to step 93 in FIG. 1G.

Figure 1G:
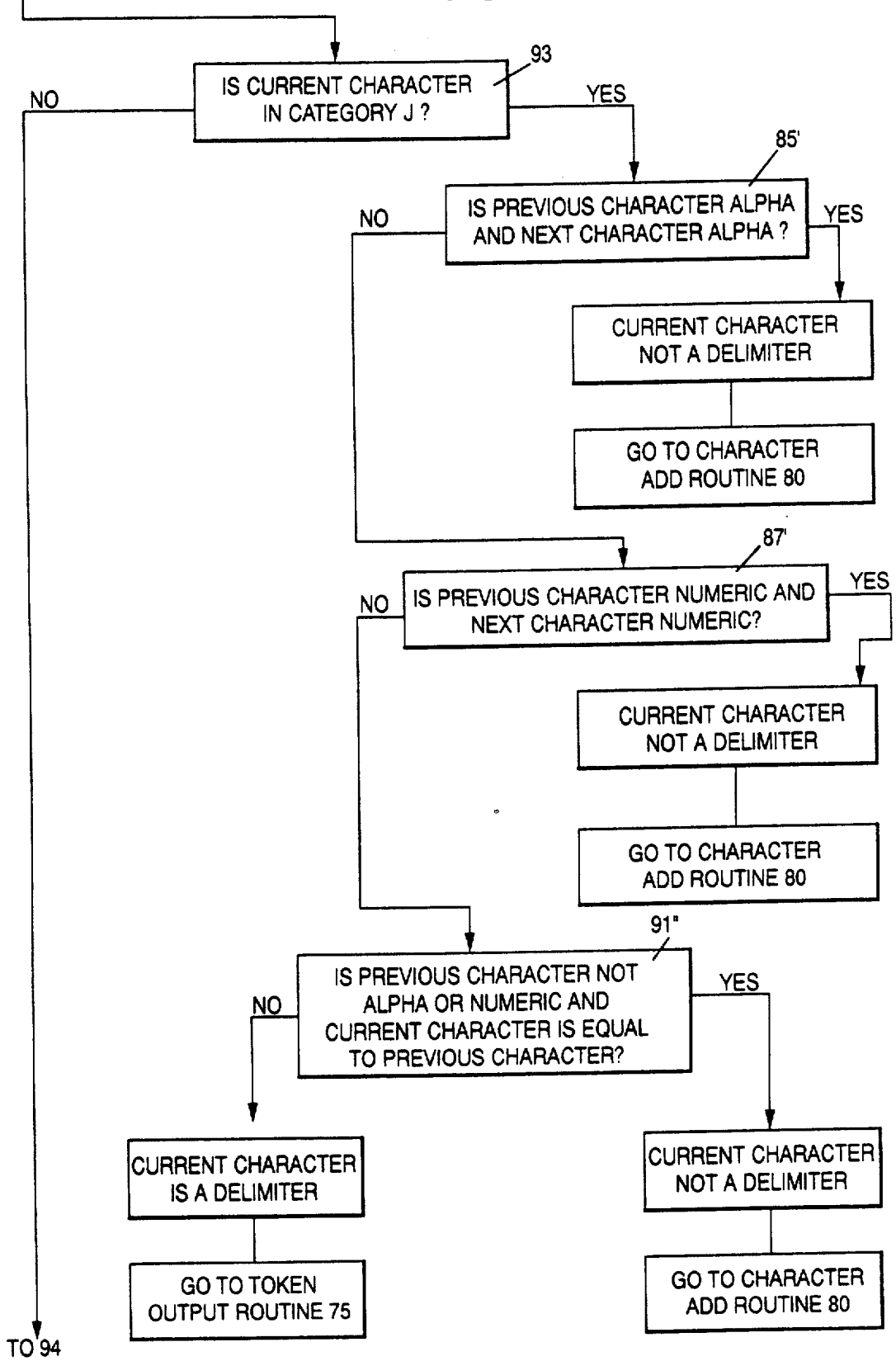
FIG. 1G is the portion of the flow diagram which processes Category J current characters.

Step 93 in FIG. 1G determines whether the current character is in Category J. If it is, then the program flows to step 85' which determines whether the previous character is an alphabetic character and whether the next character is an alphabetic character. If it is, then the current character is considered not a delimiter and the program flows to the character add routine 80. If instead, step 85' determines the negative, then the program flows to step 87' which determines whether the previous character is a numeric character and whether the next character is a numeric character. If it is, then the current character is considered not a delimiter and the program flows to the character add routine 80. If instead, step 87' determines the negative, then step 91'' determines whether the previous character is not an alphabetic character and not a numeric character and whether the current character is equal to the previous character. If it is, then the current character is considered not a delimiter and the program flows to the character add routine 80. If instead, step 91'' determines the negative, then the current character is considered a delimiter in this context and the program flows to the token output routine 75. If step 93 determines that the current character is not in Category J, then the program flows to step 94 in FIG. 1H.

Figure 1H:
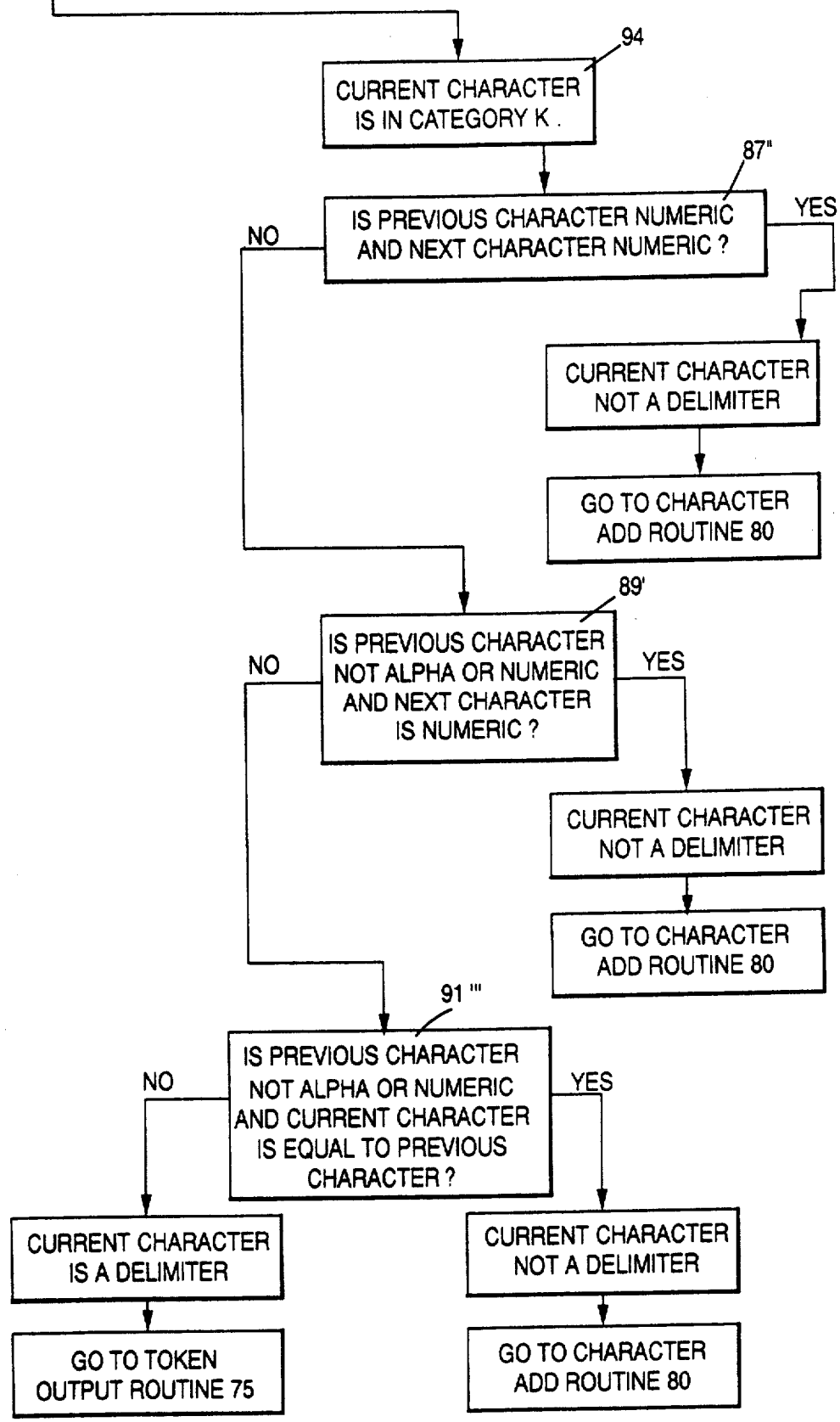
FIG. 1H is the portion of the flow diagram which processes Category K current characters.
Figure 5:
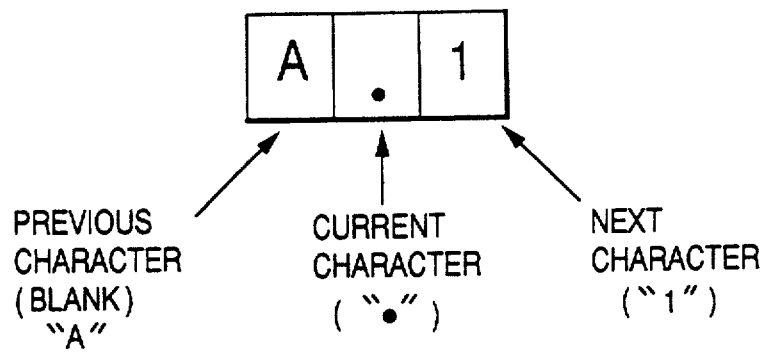
FIG. 5 illustrates Example 2.

Step 94 in FIG. 1H determines whether the current character is in Category K. This corresponds to Example 1 in FIG. 4 and Example 2 in FIG. 5, where the current character is a "." character. In step 87'' of FIG. 1H, a determination is made as to whether the previous character is numeric and the next character numeric. If it is, then the current character is not a delimiter and the program flows to the character add routine of step 80. If step 87'' determines the negative, then the program flows to step 89' where it is determined whether the previous character is not an alphabetic or numeric character and whether the next character is numeric. If it is, then the current character is not a delimiter and the program flows to the character add routine 80. If step 89' determines the negative, then the program flows to step 91''' where it is determined whether the previous character is not an alphabetic or a numeric character and the current character is equal to the previous character. If it is, then the current character is considered not a delimiter and the program flows to the character add routine 80. If step 91''' determines the negative, then the current character is considered a delimiter in this context and the program flows to the token output routine 75. In connection with Example 1 in FIG. 4 where the previous character is a blank, the current character is a ".", and the next character is a "1", step 89' of FIG. 1H determines that the previous character is not an alphabetic or a numeric character and that the next character is a numeric character. Since this is true in Example 1, the current character is considered not a delimiter in this context and therefore the program flows to the character add routine 80, where the "." character is added to the accumulating stream. In Example 2 of FIG. 5, the previous character is an "a", the current character is a ".", and the next character is a "1". In this case, step 91''' in FIG. 1H determines the negative and therefore the current character is considered to be a delimiter and the program flows to the token output routine 75, so that the existing accumulated string of characters is output as a token.

At this point, additional matching can be done against a set of prefixes and suffixes to indicate additional locations of words and delimiters, using a prefix and suffix isolation routine 47, in a manner similar to that described in the above cited A. Zamora, et al. copending patent application.

Although a specific embodiment of the invention has been disclosed, it will be understood by those having skill in the art that changes can be made to the specific embodiment without departing from the spirit and the scope of the invention.

TABLE 2

| Hex Digits 1st → 2nd ↓ | 4- | 5- | 6- | 7- | 8- | 9- | A- | B- | C- | D- | E- | F- |
|---|---|---|---|---|---|---|---|---|---|---|---|---|
| -0 |   | & |   | ø |   | ° | μ | c | { | } |   | 0 |
| -1 |   |   | e | / | E | a | j | ~ |   | A | J | 1 |
| -2 |   | a | e | A | E | b | k | s |   | B | K | 2 |
| -3 |   | a | e | A | E | c | l | t | . | C | L | 3 |
| -4 |   | a | e | A | E | d | m | u | f | D | M | U | 4 |
| -5 |   | a | i | A | I | e | n | v | § | E | N | V | 5 |
| -6 |   | ã | i | Ã | I | f | o | w | π | F | O | W | 6 |
| -7 |   | a | i | Ä | I | g | p | x | ¼ | G | P | X | 7 |
| -8 |   | c | i | C | I | h | q | y | ½ | H | Q | Y | 8 |
| -9 |   | ñ | β | Ñ | · | i | r | z | ¾ | I | R | Z | 9 |
| -A | [ | ] | | | : | < < |   |   | | | o | u | O | ³ |
| -B | . | $ | , | # | > > |   |   | | | | o | u | O | U |
| -C | < | * | % | @ | o |   | D | - | | o | u | O | U |
| -D | ( | ) | _ |   | y |   | Y |   | | o | u | O | U |
| -E | + | ; | > | = |   |   |   | · | | o | u | O | U |
| -F | ! |   | ? | " | ± |   | ® | = | ō | y | O | EO |

Code Page 00500, Version 0
Common Name     International #5
Code     EBCDIC

What is claimed is:

1. A computer method for isolating words from an input stream of characters forming natural language text, the method comprising the steps of:

storing in a data processor a character classification table which describes each character in a character code as being either a delimiter character, an alpha/numeric character or a conditional delimiter character which assumes a function of a delimiter character when it occurs in predefined character contexts;

inputting to said data processor an input stream of characters which are members of said character code, the input stream forming natural language text;

building in said data processor a string of alpha/numeric characters to form a word from said input stream of characters produced by said inputting step;

isolating in said data processor three consecutive characters from said inputting step of said input stream, as a previous character, a current character and a next character;

accessing in said data processor said character classification table in response to said isolating step, to determine if said current character is a delimiter character, an alpha/numeric character or a conditional delimiter character;

appending in said data processor said current character to said string when said character classification table identifies it as an alpha/numeric character in said accessing step;

signaling an output signal from said data processor that said string is a complete word when said character classification table identifies said current character as a delimiter character in said accessing step;

analyzing in said data processor said previous character, said current character and said next character to determine if said current character assumes the function of a delimiter character when said character classification table identifies said current character as a conditional delimiter character in said accessing step.

2. The computer method of claim 1, wherein said analyzing step further comprises:

appending in said data processor said current character to said string when said previous character is an alphabetic character and said next character is an alphabetic character.

3. The computer method of claim 1, wherein said analyzing step further comprises:
appending in said data processor said current character to said string when said previous character is a numeric character and said next character is a numeric character.

4. The computer method of claim 1, wherein said analyzing step further comprises:
appending in said data processor said current character to said string when said previous character is not an alphabetic character and not a numeric character and said next character is a numeric character.

5. The computer method of claim 1, wherein said analyzing step further comprises:
appending in said data processor said current character to said string when said previous character is not an alphabetic character and not a numeric character and said current character is a same as said previous character.

6. The computer method of claim 1, which further comprises: storing in said data processor a second character classification table which describes each character in a second character code as being either a delimiter character, an alpha/numeric character or a conditional delimiter character which assumes the function of a delimiter character when it occurs in predefined character contexts;
selecting in said data processor either the first said character code or said second character code for said input character stream;
selectively accessing in said data processor in said accessing step, either the first said character classification table or said second character classification table, in response to said step of selecting either said first character code or said second character code.

7. The computer method of claim 6, wherein said first said classification table characterizes a first natural language and said second classification table characterizes a second natural language.

8. The computer method of claim 6, wherein said first said classification table characterizes a first type data processing code and said second classification table characterizes a second type data processing code.

9. The computer method of claim 1, which further comprises:
storing in said data processor a second character classification table which describes each character in a second character code as being either a delimiter character, an alpha/numeric character or a conditional delimiter character which assumes the function of a delimiter character when it occurs in predefined character contexts, the first said classification table characterizing a first natural language and said second classification table characterizing a second natural language;
selectively accessing in said accessing step, either the first said character classification table or said second character classification table, in response to selecting either said first natural language or said second natural language for said input character stream.

10. The computer method of claim 1, which further comprises the step of comparing in said data processor said characters in said input stream with a predefined set of prefixes and suffixes to indicate additional locations of words in said input stream.

11. The computer method of claim 1, which further comprises the steps of:
outputting from said data processor said complete word identified in said signaling step, as a search term and inputting it into an index for dictionary accessing.

12. The computer method of claim 1, which further comprises the steps of:
outputting from said data processor said complete word identified in said signaling step, as a search term and inputting it into an index for database accessing.

13. The computer method of claim 1, which further comprises the steps of: outputting from said data processor said complete word identified in said signaling step, as a word in a first natural language and inputting it into a language translator for translation into a word in a second natural language.

14. The computer method of claim 1, applied to an input stream containing chemical literature terms.

15. The computer method of claim 1, applied to an input stream containing mathematical literature terms.

* * * * *